(12) United States Patent
Pamplona

(10) Patent No.: US 9,486,969 B2
(45) Date of Patent: Nov. 8, 2016

(54) METHOD FOR REPAIRING FLEXIBLE FLOW LINES WITH A TWO-PIECE CLAMPING COLLAR AND COMPOSITE MATERIAL

(71) Applicant: PETROLEO BRASILEIRO S.A.—PETROBRAS, Rio de Janeiro (BR)

(72) Inventor: Heraldo Raimundo Pinto Pamplona, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 14/606,484

(22) Filed: Jan. 27, 2015

(65) Prior Publication Data

US 2015/0210022 A1 Jul. 30, 2015

(30) Foreign Application Priority Data

Jan. 30, 2014 (BR) .......................... 10 2014 002292

(51) Int. Cl.
| | |
|---|---|
| *B32B 41/00* | (2006.01) |
| *B29C 73/02* | (2006.01) |
| *B29C 73/14* | (2006.01) |
| *F16L 1/26* | (2006.01) |
| *F16L 55/172* | (2006.01) |
| *F16L 55/175* | (2006.01) |
| *B29L 23/00* | (2006.01) |

(52) U.S. Cl.
CPC ............... *B29C 73/02* (2013.01); *B29C 73/14* (2013.01); *F16L 1/26* (2013.01); *F16L 55/172* (2013.01); *F16L 55/175* (2013.01); *B29L 2023/22* (2013.01)

(58) Field of Classification Search
CPC ...... B29C 73/02; B29C 73/14; F16L 55/175; F16L 1/26; F16L 55/172; B29L 2023/22
USPC .................... 156/53, 94; 138/97, 99; 285/15
See application file for complete search history.

(56) References Cited

U.S. PATENT DOCUMENTS

| | | |
|---|---|---|
| 5,027,862 A | 7/1991 | Laybourn |
| 6,305,719 B1 | 10/2001 | Smith, Jr. et al. |
| 7,500,494 B2 | 3/2009 | Robinson et al. |
| 2004/0129373 A1 | 7/2004 | Nadarajah et al. |
| 2007/0107791 A1* | 5/2007 | Rice ........................ B29C 70/32 138/99 |

* cited by examiner

*Primary Examiner* — Michael N Orlando
*Assistant Examiner* — Joshel Rivera
(74) *Attorney, Agent, or Firm* — Sughrue Mion, PLLC

(57) ABSTRACT

The present invention refers to a method to repair flexible flow lines used in the petroleum industry. This method provides a means for quick and permanent repairs of birdcage-type failures (BC) in flexible ducts while they are in operation, without interrupting production flows. The technology proposed, because of its simple characteristics, eliminates the need for replacing the affected section and for allocating special vessels to perform the repair.

19 Claims, No Drawings

METHOD FOR REPAIRING FLEXIBLE FLOW LINES WITH A TWO-PIECE CLAMPING COLLAR AND COMPOSITE MATERIAL

FIELD OF THE INVENTION

The present invention relates to a method to repair flexible flow lines used in the petroleum industry. This method enables quickly repairing a flexible duct displaying a birdcage (BC) type failure without interrupting production flows. The technology proposed, because of its simple characteristics, eliminates the need for replacing the affected section.

BACKGROUND OF THE INVENTION

In offshore petroleum production systems, the petroleum produced by wells located on the ocean floor is carried to stationary production units (SPU) using pipes. The set of pipes used to inject water and pump oil and gas is conventionally known as flow lines.

This set of pipes, which comprises the flow lines, can be basically split into two different types: rigid and flexible, and extend from the producing well to the platform, to which they are connected using support structures especially designed to support and resist the stresses that result both from their own weight and their movement.

Flexible flow lines may be described as being ducts comprising the overlaying at least six independent layers of completely different composition: the first and innermost layer is the inner carcass, followed by a polymeric pressure sheath; this is followed by the pressure armour, the internal tensile armour and the external tensile armour, which comprise braided steel wire. Over all of these, we have an external polymeric sheath.

A preliminary inventory of the company's huge industrial park shows that there are currently some 5,000 kilometers of flexible ducts operating in the different Brazilian sedimentary basins, with diameters ranging from 7 to 45 centimeters.

Thus, the collection of flexible ducts in Brazil is quite heterogeneous. Different production units have flexible ducts of different diameters and different ages. Added to this scenario, we have the internal pressure caused by the fluids conveyed, the external pressure exerted by the environment, the internal friction between the various layers comprising the duct, corrosion and fatigue. In addition to these, there are all manner of influences caused by the environment in which structure is assembled, such as marine currents, salinity, changing tides, waves, incrustations with living organisms and external impacts.

This data demonstrates the value of preventive maintenance techniques and the importance of searching for efficient and quick techniques for corrective maintenance.

In spite of all the precautions taken to prevent failure, among the failures that can happen is a characteristic phenomenon that is regularly found in flexible ducts, known as birdcaging. This structural failure is the result of, among other factors, sudden and instantaneous depressurising of the duct, which causes radial expansion of the outermost tensile armour through tears in the outer sheath.

Briefly, the failure is due to tears in the outer polymeric sheath, in general associated with the effects caused by said depressurisation of the duct, causing the steel braid lying immediately under it to be exposed to an aggressive medium. Furthermore, the absence of any sheath effect exerted by the outermost polymer layer on the section of duct bearing the tear allows the internal pressure of the duct to push the successive layers in this region outwards, further exposing the steel braid that was uncovered by the tear, thus giving rise to failures that look like a "birdcage" (BC).

This type of failure not only changes the standard distribution of the stresses along the various layers comprising the flexible duct, it also results in faster action of the aggressive medium on the outer structural steel braid and the polymer layer immediately under it, which are exposed directly to the marine environment.

Defects such as these seriously compromise the integrity of the line, weakening the wires in the duct structure due to corrosion. Thus, as a safety measure, it is recommended that use of the duct be suspended until the damaged section can be replaced with a new one.

According to current prior art, this is achieved by replacing the damaged section. However, an intervention to replace a section of flexible duct where birdcaging has been detected involves mobilizing special PLSV (Pipe-Laying Support Vessels) and drilling rigs, making the operation quite costly. The intervention also takes a long time, as much as 15 to 16 days.

One must also consider the availability of special vessels and equipment to perform the repair procedure. Production losses to prepare the line are considerable, and currently there are no alternative methods to correct this type of defect in flexible ducts.

It is clear that a large petroleum concern requires a technical and administrative structure dedicated to the periodic inspection and correction of sections that are damaged or under imminent risk of leakage. Despite all efforts to this effect, the extension and different types of flexible ducts that comprise the Brazilian industrial park results in a vendor funnel in terms of the availability of the materials required, such as flexible duct sections and connections of a diameter corresponding to the damaged sections. These hurdles can delay such an intervention for months.

Relevant Prior Art

There is a varied history of devices whose purpose is to repair rigid ducts exhibiting some form of wall failure.

Document U.S. Pat. No. 5,027,862 of 2 Jul. 1991 refers to basic technology to repair rigid ducts whereby a resin is applied around the duct, encapsulated in a casing.

Document U.S. Pat. No. 6,305,719 of 23 Oct. 2001 refers to clamps provided with seals, both two-component, applied around the affected section of a duct, with the possibility of applying some sort of sealant inside the clamps.

Document US 2004/0129373 of 8 Jul. 2004 describes a method to permanently repair damaged or weakened ducts. The method consists of removing the rust, the old coating and other undesired surface defects with an abrasive jet. The damaged or weakened surface is then packed in a wrap comprising at least one layer of reinforced composite material. The composite wrap is allowed to cure. If necessary to provide mechanical strength to the affected section of the duct, the affected area is enclosed in sleeves.

Document U.S. Pat. No. 7,500,494 of 10 Mar. 2009 also refers to a method to repair or reinforce damaged ducts. A layer of fibre is placed around the duct and a clamp is placed around it. Resin is injected so as to permeate the fibres applied.

One can also mention documents such as "*The flexible grouted clamp—A novel approach to emergency pipeline repair*" by Roland Palmer-Jones, Gordon Paterson and Glenn Aldo Nespeca, presented at the 2011 Pipeline Conference & Exposition. Said paper also discusses attempts to repair ducts, and shows the extent to which this is a contemporary problem, requiring constant research and searching for suitable solutions.

The present invention was developed with the idea of repairing birdcage-type failures in flexible ducts used in the oil industry.

Thus, a method has been developed to repair flexible flow lines using a two-piece clamping collar and a composite material.

The invention described herein is the result of continuous research in this area, the aim of which is to simplify the procedure currently employed, reducing the time taken for each repair and the overall cost of each intervention. It also aims to provide a new concept in the repair of flexible ducts, whereby the line and its original geometry are maintained, including the wire armour mesh.

Other advantages this method to repair flexible ducts proposes to deliver are listed below:
1. Eliminate the need to interrupt production before or during corrective maintenance;
2. Eliminate the need for special PLSVs (Pipe Laying Support Vessels) and drilling rigs;
3. Eliminate the need to replace the damaged section;
4. Considerably simplify the repair procedure;
5. Significantly improve the performance of the damaged line;
6. Make each intervention more agile;
7. Eliminate the dependence on section and connector vendors.

SUMMARY OF THE INVENTION

The present invention comprises a method to repair flexible duct, essentially following the steps of:
- visually inspecting the condition of the outer polymeric layer;
- determining the dimensions of the failure;
- determining the depth and temperature where the defect is located, and the descent time;
- determining the dimensional parameters of the duct to be repaired;
- cleaning the exposed steel mesh and the surface of the polymer sheath on the section of duct to be repaired;
- on land, manufacturing the two-piece clamping collar to be used;
- calculating the volume of epoxy resin required for the repair procedure;
- preparing the composite resin so that, once it is mixed, it will arrive at the location where it will be applied sufficiently malleable so as to penetrate the birdcage mesh;
- splitting the total volume of composite resin into two equal volumes, and pack each one in a fabric bag with a warp of natural fibres;
- attaching each bag of composite resin to the inside of each section of the two-piece clamping collar;
- placing all of the material in the ROV (Remotely Operated Vehicle);
- reducing the operating pressure in the line;
- lowering the two-piece clamping collar with the fabric bags filled with composite resin to the location where the failure is within a pre-determined amount of time;
- placing the two-piece clamping collar around the section with the failure and attaching it using suitable means.

DETAILED DESCRIPTION OF THE INVENTION

The method to repair a flexible flow line duct using a two-piece clamping collar and composite material that is the object of this invention was developed based on research designed primarily to develop alternatives to the corrective procedures currently available, providing the technical team with a method that enables faster intervention in the event of birdcage-type failures in flexible ducts.

As mentioned above, the existence of birdcage-type failures requires reducing the pressure in the duct, and consequently the output rate, or even stopping the line altogether. This interference in production lasts until all of the logistics operations currently required to replace defective sections can be completed, causing major delays.

Similar corrective measures using clamps and/or resin are known from prior art, but are all designed for application in rigid ducts. When these methods are applied to correct flexible ducts used to produce crude oil, they to not yield satisfactory results due to a number of specific details and characteristics of the affected components.

The present invention provides a means whereby a permanent correction can be made to a birdcage-type failure using composite resin and two-piece clamping collars, yielding a result that is both reliable and low cost, and reducing the risk of new failures in the same section once the affected line is back in full and continuous operation.

Thus the proposed method fulfils minimum parameters such as resistance to the duct's working pressure, providing corrosion protection for the exposed section of line, and keeping this section from moving during the repair. The method consists of the following steps, preferably performed in the following order:

Step 1: Visually inspect the state of repair of the outer polymer sheath, either remotely or not.

It is important to know the extent to which the exposed steel mesh has been structurally compromised, such as the degree of oxidation, the existence of torn wires, incrustations, etc. This information will determine if the proposed method will be applied, or if one of the options available in the market will be selected.

The data gathered during this step is also essential to size the equipment that will be used during the intervention.

This and other on-site data gathering may be done by divers or using an ROV (Remotely Operated Vehicle), depending on the depth.

Step 2: Determine the parameters of the birdcage failure, either remotely or not.

As the industrial park is comprised of kilometers of flexible ducts of all sorts of diameters, and diverse operating pressures, it makes more economic sense to manufacture a specific two-piece clamping collar for each failure incident than to keep an inventory of several items with different combinations of diameters, lengths and mechanical resistance.

The dimensional characteristics of the birdcage must also be determined to define the size and extension of the section to be covered by the proposed structural reinforcement, which will also influence the manufacturing parameters for the components that will be used.

Step 3: Preferably together with Step 1 or Step 2, ascertain the depth and temperature at the location of the defect, and the descent time.

These parameters are essential for dosing the components of the epoxy resin to be used, and the curing process, so that mixture remains within the viscosity limits that will keep it perfectly malleable until the repair is completed.

Step 4: Determine the hydrostatic test pressure of the flexible duct, normally available in the manufacturer's data sheet.

If this data is not available, use the operating pressure of the flexible duct in the manufacturer's data sheet, and apply a safety factor of not less than 1.5.

Step 5: Determine the dimensional parameters of the duct to be repaired, available in the manufacturer's data sheet.

In addition to the data obtained in step 2, one must also know the model and the nominal diameter of the flexible duct, which are used as parameters for manufacturing the two-piece clamping collar that will be used for the repair.

Step 6: Thoroughly clean the exposed steel mesh, as well as the surface of the polymer sheath in the section of duct to be repaired.

Step 7: On land and together with step 6, arrange for the manufacture of the two-piece clamping collar that will be used, which should fulfil the following parameters:
- preferably manufactured of steel.
  - having an inside diameter up to 15% larger than the nominal design diameter of the flexible duct in question.
  - being provided with through-holes of up to 6 mm in diameter, arrayed circumferentially along the clamp at intervals of about 50 mm along the surface of each half-section of the two-piece clamping collar.
  - having a degree of mechanical resistance that is compatible with the parameters collected in step 4.
  - having a length that is compatible with the parameters collected in step 2;

Step 8: Calculate the volume of epoxy resin required for the repair procedure.

The total amount of epoxy resin to be prepared is given by the volume of the annular space created between the outer wall of the flexible duct and the inside diameter of the two-piece clamping collar to be manufactured, plus 20 to 30%.

The resin to be prepared shall be split into equal parts, packaged and placed on the inside of each section of two-piece clamping collar. When these are placed over the duct failure and joined, the resin will penetrate the steel wire mesh of the birdcage, and the excess will flow out of the ends of the two-piece clamping collar and through the small round holes placed in the two-piece clamping collar.

Thus, the total volume of composite resin must be sufficient to fill the interstices of the failure and the entire perimeter of the section covered by the two-piece clamping collar, making sure there are no gaps through which salt water could penetrate into the repair.

Step 9: Prepare the composite resin before all of the components are lowered to the application site, according to the following parameters:
- a composite epoxy resin reinforced with aramid type synthetic fibres.
- the curing agent shall be dosed according to the descent time calculated in step 3, so that once it is mixed, the resin will arrive at the location where it will be applied with sufficient malleability to penetrate the birdcage mesh. This malleability characteristic is equivalent to a consistency preferably between 0.5 and 0.6 $N \cdot s/m^2$ at the temperature computed in step 3.
- being sufficient to satisfy the volume calculated in step 8.

Step 10: Split the total volume of composite resin into two equal volumes and pack each one in a bag made with a warp and weft of natural fibres with a mesh such as to have the space between threads measure on the order of 0.5 to 1.0 mm;

If the bag is manufactured of synthetic fibre, because such fibres are continuous, the weft and warp will comprise continuous monofilaments, resulting in a weave where the space between threads is completely empty. This characteristic allows the composite resin to escape through the spaces between the threads during the descent to the work site, resulting in the volume of resin for application being smaller than the amount calculated, and thus compromising the quality of the repair.

On the other hand, if the bags are manufactured of synthetic fibre with a mesh such as the space between threads is less than the proposed 0.5 to 1.0 mm, the mesh will hold the composite resin until it reaches the work site. However, in this case the composite resin will be unable to ooze through the mesh efficiently when the two-piece clamping collar is closed around the flexible duct, resulting in resin impregnation gaps between the steel wires that make up the birdcage.

Bags of natural fibre have revealed themselves to be more efficient. As natural fibres are short, there will always be fibre-ends protruding from the threads of the warp and weft of the fabric, which tend to cover the gaps between threads, forming a barrier for the composite resin as it travels to the work site. However, this additional barrier does not keep the composite resin from oozing perfectly through the spaces between the threads when compressed between the two sections of the two-piece clamping collar and the outer wall of the flexible duct.

Step 11: Attach each bag of composite resin on the inside of each section of the two-piece clamping collar;

The bags are attached to the two-piece clamping collar by tying them with cords using the holes in each section of the two-piece clamping collar.

Step 12: Place all of the material in the ROV (Remotely Operated Vehicle);

Step 13: Reduce the operating pressure in the line until the birdcage failure contracts and the layers before the steel mesh can be slightly compressed.

In this step, the pressure in the line is reduced, but not to zero, as the intact section of the flexible duct will serve as support, opposing the pressure exerted by the two-piece clamping collar sections. If there is no ideal opposing pressure, the composite resin will be unable to extrude from the fabric bag and efficiently impregnate the interstices of the steel wire mesh and the remaining birdcage failure.

Step 14: Lower the two-piece clamping collar with the fabric bags filled with composite resin to the location where the failure is within the period of time calculated in step 3.

Step 15: Place the two-piece clamping collar around the section with the failure and attach it using a suitable means, such as bolts, jaws or quick connect devices.

Although the steps in the proposed method are well defined for design purposes, to those skilled in the art it will be easy to see that some steps could be performed in a different sequence or simultaneously without affecting the efficiency and the purpose to be attained.

It is easy to see that the present invention not only eliminates the need to stop the flow line, it also eliminates the need to radically section the flexible duct, resulting in discontinuous sections.

Another advantage that enables the current proposal, beyond its easy assembly, is that it eliminates the need to mobilise specific, high cost vessels for several days.

In light of such evidence, there is no question that the proposed invention not only eliminates direct production losses, but also the cost associated with the logistics of the teams and equipment dedicated to resolving the different birdcage-type incidents that can happen in a large size industrial park.

The invention is described herein with reference made to its preferred embodiments. It should be clear however that this invention is not limited to these embodiments, and those skilled in the art will immediately realise that changes and substitutions are possible within the concept of invention described herein.

The invention claimed is:

1. A method for repairing a flexible flow line duct using a two-piece clamping collar and composite material, comprising permanently repairing a birdcage failure of a damaged section of duct by applying an epoxy resin around the damaged section of duct and subsequently placing a two-piece clamping collar around the section, wherein the duct includes a steel mesh layer covered by an outer polymeric layer, and the birdcage failure includes a portion of the steel mesh becoming exposed through the outer polymeric layer, the method including the following steps:
   1) visually inspecting a state of repair of the outer polymeric layer of the damaged section of duct;
   2) measuring a size of the birdcage failure;
   3) determining a depth and temperature at a location of the birdcage failure, and a descent period of time to reach the location of the birdcage failure;
   4) determining dimensional parameters of the damaged section of duct to be repaired;
   5) thoroughly cleaning the exposed portion of steel mesh of the birdcage failure, as well as a surface of the outer polymeric layer of the damaged section of duct to be repaired;
   6) arranging for manufacture of the two-piece clamping collar;
   7) calculating a volume of epoxy resin required to repair the birdcage failure;
   8) preparing the epoxy resin before the two-piece clamping collar is lowered to the damaged section of duct, which includes selecting a content of a curing agent of the epoxy resin based on the descent time calculated in Step 3, so that once mixed, the epoxy resin will arrive at the location of the birdcage failure sufficiently malleable to penetrate the exposed portion of steel mesh;
   9) splitting a total volume of epoxy resin into two equal volumes, and respectively packing each of the two equal volumes in their own separate fabric bag, each bag comprising a warp of natural fibres;
   10) attaching each bag of epoxy resin to an inside of each section of the two-piece clamping collar;
   11) placing the two-piece clamping collar obtained in Step 10 in an ROV (Remotely Operated Vehicle);
   12) reducing an operating pressure in the duct until the birdcage failure contracts and layers of the duct that are interior of the steel mesh are compressed;
   13) lowering the two-piece clamping collar with the fabric bags filled with epoxy resin to the location of the birdcage failure, within the decent period of time calculated in Step 3;
   14) placing the two-piece clamping collar around the damaged section of duct; and
   15) securing said two-piece clamping collar with a means for fastening.

2. The method for repairing a flexible flow line duct with a two-piece clamping collar and composite material according to claim 1, wherein the data gathering in Steps 1 and 2 is performed by divers or an ROV, depending on the depth.

3. The method for repairing a flexible flow line duct with a two-piece clamping collar and composite material according to claim 1, wherein the two-piece clamping collar is manufactured according to the following parameters:
   being manufactured of steel;
   having an inside diameter up to 15% larger than the nominal design diameter of the damaged section of duct;
   being provided with through-holes in each section of the two-piece clamping collar;
   having a degree of mechanical resistance that is compatible with the parameters collected in Step 4; and
   having a length that is compatible with the parameters collected in Step 2.

4. The method for repairing a flexible flow line duct with a two-piece clamping collar and composite material according to claim 1, wherein the calculation of the volume of epoxy resin in Step 7 is given by the volume of an annular space created between the duct and an inside diameter of the two-piece clamping collar to be manufactured, plus 20 to 30%.

5. The method for repairing a flexible flow line duct with a two-piece clamping collar and composite material according to claim 1, wherein the epoxy resin has the following minimum characteristics:
   being a composite epoxy resin reinforced with aramid synthetic fibres;
   having a degree of malleability that is equivalent to a consistency between 0.5 and 0.6 N·s/m$^2$ at the temperature computed in Step 3; and
   being sufficient to satisfy the volume calculated in Step 8.

6. The method for repairing a flexible flow line duct with a two-piece clamping collar and composite material according to claim 1, wherein the fabric of each bag in Step 10 has a weave where a space between threads is in the range of between 0.5 mm and 1.0 mm.

7. The method for repairing a flexible flow line duct with a two-piece clamping collar and composite material according to claim 1, wherein the means for fastening used in Step 15 is selected from the group consisting of bolts, jaws and quick-connect devices.

8. The method for repairing a flexible flow line duct with a two-piece clamping collar and composite material according to claim 1, wherein the method is applied to a flexible duct.

9. The method for repairing a flexible flow line duct with a two-piece clamping collar and composite material according to claim 1, wherein Step 3 is performed concomitantly with Step 1.

10. The method for repairing a flexible flow line duct with a two-piece clamping collar and composite material according to claim 1, wherein Step 3 is performed concomitantly with Step 2.

11. The method for repairing a flexible flow line duct with a two-piece clamping collar and composite material according to claim 1, wherein the dimensional parameters in Step 4 are obtained from a manufacturer's data sheet.

12. The method for repairing a flexible flow line duct with a two-piece clamping collar and composite material according to claim 3, wherein the two-piece clamping collar is provided with through-holes of up to 6 mm in diameter.

13. The method for repairing a flexible flow line duct with a two-piece clamping collar and composite material according to claim 3, wherein the two-piece clamping collar is provided with a plurality of through-holes arranged circumferentially around the clamp.

14. The method for repairing a flexible flow line duct with a two-piece clamping collar and composite material according to claim 3, wherein the two-piece clamping collar is provided with a plurality of through-holes arranged circumferentially around the clamp at intervals of about 50 mm along the surface of each half-section of the two-piece clamping collar.

15. The method for repairing a flexible flow line duct with a two-piece clamping collar and composite material according to claim 12, wherein a plurality of the through-holes are arranged circumferentially around the clamp at intervals of about 50 mm along the surface of each half-section of the two-piece clamping collar.

16. The method for repairing a flexible flow line duct with a two-piece clamping collar and composite material according to claim 8, wherein the flexible duct comprises, in the following order, an inner carcass layer, a polymeric pressure sheath layer, an internal tensile armour layer, an external tensile armour layer which is the steel mesh layer, and an external polymeric sheath which is the outer polymeric layer.

17. The method for repairing a flexible flow line duct with a two-piece clamping collar and composite material according to claim 1, wherein the steel mesh layer comprises braided steel wire.

18. The method for repairing a flexible flow line duct with a two-piece clamping collar and composite material according to claim 5, wherein the fabric of each bag in Step 10 has a weave where a space between threads is in the range of between 0.5 mm and 1.0 mm.

19. The method for repairing a flexible flow line duct with a two-piece clamping collar and composite material according to claim 18, wherein the two-piece clamping collar is manufactured according to the following parameters:
   being manufactured of steel;
   having an inside diameter up to 15% larger than the nominal design diameter of the damaged section of duct;
   being provided with through-holes in each section of the two-piece clamping collar;
   having a degree of mechanical resistance that is compatible with the parameters collected in Step 4; and
   having a length that is compatible with the parameters collected in Step 2.

\* \* \* \* \*